(12) United States Patent
Matsuyama et al.

(10) Patent No.: US 9,420,615 B2
(45) Date of Patent: Aug. 16, 2016

(54) INFORMATION PROCESSING APPARATUS, INFORMATION PROCESSING METHOD, AND PROGRAM

(71) Applicant: SONY CORPORATION, Minato-ku (JP)

(72) Inventors: Yuji Matsuyama, Tokyo (JP); Masato Shimakawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/591,174

(22) Filed: Jan. 7, 2015

(65) Prior Publication Data

US 2015/0245391 A1    Aug. 27, 2015

(30) Foreign Application Priority Data

Feb. 27, 2014   (JP) ................................. 2014-036434

(51) Int. Cl.
*H04W 16/14* (2009.01)
*H04W 76/02* (2009.01)
*H04W 4/20* (2009.01)

(52) U.S. Cl.
CPC ............ *H04W 76/021* (2013.01); *H04W 4/206* (2013.01)

(58) Field of Classification Search
USPC ................................. 455/451, 452.1
See application file for complete search history.

(56) References Cited

U.S. PATENT DOCUMENTS

2014/0118159 A1* 5/2014 Fish .................. H04Q 9/00
340/870.01

FOREIGN PATENT DOCUMENTS

JP    2013-205862 A    10/2013

* cited by examiner

*Primary Examiner* — Kevin Kim
(74) *Attorney, Agent, or Firm* — Oblon, McClelland, Maier & Neustadt, L.L.P.

(57) ABSTRACT

An information processing apparatus includes a communication unit; and a controller configured to control the communication unit to perform one of transmission and reception of second identification information for communication through a predetermined communication path with a different apparatus, and to establish connection with the different apparatus by using the second identification information, during an audio call with the different apparatus, the audio call using first identification information for an audio call, the second identification information being associated with the first identification information.

13 Claims, 14 Drawing Sheets

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2014-036434 filed Feb. 27, 2014, the entire contents of which are incorporated herein by reference.

BACKGROUND

The present disclosure relates to an information processing apparatus that is capable of making audio call with another apparatus, an information processing method for the information processing apparatus, and a program.

At the moment, various apparatuses can communicate with each other using various network connection techniques. In order to establish communication between such apparatuses for the first time, a process of exchanging IDs between the apparatuses to associate them with each other (paring process) needs to be performed in some cases.

SUMMARY

However, the paring process is complicated and troublesome for a user, and is expected to be simplified.

In view of the circumstances as described above, it is desirable to provide an information processing apparatus that is capable of reducing the complication of the paring process performed between the apparatuses, an information processing method for the information processing apparatus, and a program.

According to an embodiment of the present disclosure, there is provided an information processing apparatus including a communication unit and a controller. The controller is configured to control the communication unit to perform one of transmission and reception of second identification information for communication through a predetermined communication path with a different apparatus, and to establish connection with the different apparatus by using the second identification information, during an audio call with the different apparatus, the audio call using first identification information for an audio call, the second identification information being associated with the first identification information.

Accordingly, the information processing apparatus is capable of reducing the complication of the paring process performed between the apparatuses by exchanging the second identification information with the different apparatus to establish communication with each other with the simple process of making an audio call with the different apparatus.

The information processing apparatus may include a display unit. In this case, the controller may be configured to control the display unit to display a user interface configured to receive the second identification information, and to receive an operation of determining whether or not communication is established, the operation being performed by a user of the information processing apparatus.

Accordingly, the information processing apparatus is capable of causing a user to determine whether or not the paring process with the different apparatus is performed.

The controller may be configured to control the communication unit to cut off the established communication in a case where the audio call is terminated.

Accordingly, the information processing apparatus is capable of ensuring the security of the second identification information by validating the communication with the different apparatus only during an audio call with the different apparatus.

The information processing apparatus may further include a storage unit. In this case, the controller may be configured to control the storage unit to store the second identification information received from the different apparatus, and to control the communication unit to establish communication with the different apparatus with the stored second identification information after the audio call is terminated.

Accordingly, the information processing apparatus is capable of establishing the communication with the different apparatus even after the call is terminated by storing the second identification information.

The controller may be configured to control the communication unit to transmit, to the different apparatus, a request to search for at least one neighboring apparatus that is communicated with the different apparatus, and to establish communication with the at least one neighboring apparatus searched for by the different apparatus in response to the request, during the audio call.

Accordingly, the information processing apparatus is capable of establishing the communication with also a neighboring apparatus of the different apparatus by calling the different apparatus.

The information processing apparatus may further include a display unit. In this case, the controller may be configured to control the communication unit to receive information on a list of the at least one neighboring apparatus, and to control the display unit to display a user interface that receives an operation of selecting one of the at least one neighboring apparatus as a communication target based on the information of the list, the at least one neighboring apparatus being searched for by the different apparatus in response to the request.

Accordingly, the information processing apparatus is capable of easily establishing the communication with a neighboring apparatus of the different apparatus by using the user interface.

The controller may be configured to control the communication unit to perform one of transmission and reception of the second identification information through a communication path different from the communication path for the audio call with the different apparatus.

Accordingly, the information processing apparatus is capable of easily exchanging the second identification information during an audio call with the different apparatus.

The controller may be configured to perform one of transmission and reception of the second identification information via a server apparatus on a predetermined network, the server apparatus being capable of connecting with the information processing apparatus and the different apparatus. In this case, the server apparatus may be configured to receive the second identification information of one of the information processing apparatus and the different apparatus from one of the information processing apparatus and the different apparatus and store the received second identification information when the audio call starts, and to remove the stored second identification information when the audio call is terminated.

Accordingly, the information processing apparatus is capable of exchanging the second identification information by communicating with the server apparatus during an audio call, and it is possible to prevent the second identification information from being carelessly stored in the server apparatus.

The controller may be configured to control the communication unit to perform one of transmission and reception of the second identification information through the communication path for the audio call as an audio signal that can be demodulated between the controller and the different apparatus.

Accordingly, the information processing apparatus is capable of directly exchanging the second identification information as audio data with the communication path for an audio call, and it is possible to improve the security of the second identification information.

The controller may be configured to perform one of transmission and reception of the second identification information as a signal having an inaudible frequency.

Accordingly, the information processing apparatus is capable of transmitting or receiving the second identification information to prevent an audio call made by a user from being disturbed.

The information processing apparatus may further include an audio output unit. In this case, the controller may be configured to control the audio output unit to output audio information representing that the user interface is displayed.

Accordingly, the information processing apparatus is capable of performing the paring process with the different apparatus by causing the user to recognize the presence of the user interface by sound even if the user does not watch the display unit during an audio call.

The controller may be configured to control the display unit to display information on the different apparatus that has established the communication as a part of a user interface of an application for an audio call, the user interface including a list of a name of a user of the different apparatus and the first identification information, the different apparatus being identified by the second identification information.

Accordingly, the information processing apparatus is capable of causing the user to easily access the different apparatus via the application for an audio call (e.g., telephone book application).

According to another embodiment of the present disclosure, there is provided an information processing method including performing one of transmission and reception of second identification information for communication through a predetermined communication path with a different apparatus, and establishing connection with the different apparatus by using the second identification information, during an audio call with the different apparatus, the audio call using first identification information for an audio call, the second identification information being associated with the first identification information.

According to still another embodiment of the present disclosure, there is provided a program that causes an information processing apparatus to execute the steps of performing one of transmission and reception of second identification information for communication through a predetermined communication path with a different apparatus, and establishing connection with the different apparatus by using the second identification information, during an audio call with the different apparatus, the audio call using first identification information for an audio call, the second identification information being associated with the first identification information.

As described above, according to the present disclosure, it is possible to reduce the complication of the paring process performed between the apparatuses. However, the effects do not limit the present disclosure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.
(Overview of System)

Figure 1:
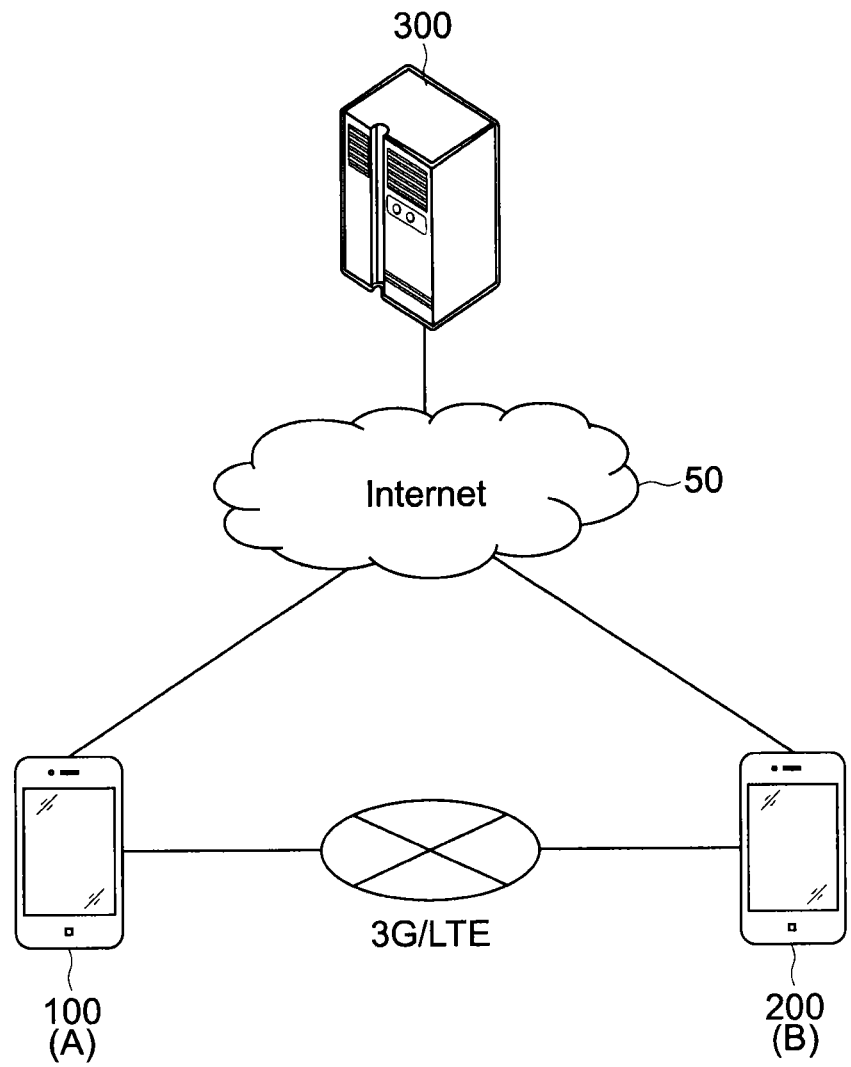
FIG. 1 is a diagram showing the configuration of a system according to an embodiment of the present disclosure.

FIG. 1 is a diagram showing the configuration of a system according to an embodiment of the present disclosure As shown in FIG. 1, a system according to this embodiment includes a smartphone 100, a smartphone 200, and a server 300.

The smartphone 100 and the smartphone 200 are capable of making an audio call through a communication path for a mobile phone such as 3rd Generation (3G) and Long-Term Evolution (LTE).

On the other hand, the smartphone 100 and the smartphone 200 are capable of communicating with a server on an Internet 50.

Moreover, in this embodiment, in order to establish communication between the smartphone 100 and the smartphone 200 by using a network connection technique such as Wireless Fidelity (Wi-Fi) and Bluetooth (registered trademark), a process of associating the smartphones with each other (paring process) needs to be performed as a preliminary process.

In this embodiment, the associating process is performed with an audio call between the smartphones being as a trigger. The state where the smartphones are associated with each other represents that the smartphones can communicate with each other using the network connection technique at any time.

In FIG. 1, only two smartphones are shown. However, three or more smartphones may make an audio call with each other and may be connected to the server 300.

(Hardware Configuration of Smartphone)

Figure 2:
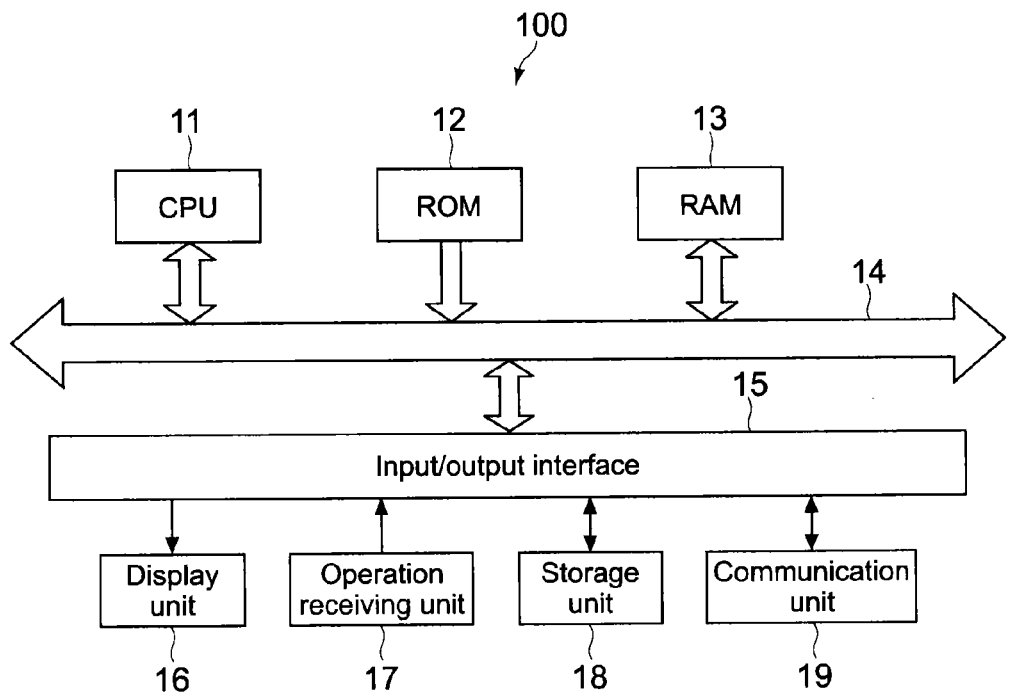
FIG. 2 is a diagram showing the hardware configuration of one smartphone in the system.

FIG. 2 is a diagram showing the hardware configuration of the smartphone 100. As shown in FIG. 2, the smartphone 100 includes a central process unit (CPU) 11, a read only memory (ROM) 12, a random access memory (RAM) 13, an input/output interface 15, and a bus 14 connecting them with each other.

The CPU 11 arbitrarily accesses the RAM 13 or the like as necessary and integrally controls the entire blocks of the smartphone 100 while performing various types of calculation processing. The ROM 12 is a non-volatile memory in which an operating system (OS) to be executed by the CPU 11 and firmware such as a program and various parameters are statically stored. The RAM 13 is used as, for example, a work area of the CPU 11, and temporarily stores the OS, various applications being executed, and various types of data being processed.

To the input/output interface 15, a display unit 16, an operation receiving unit 17, a storage unit 18, a communication unit 19 and the like are connected.

The display unit 16 is, for example, a display device using a liquid crystal display (LCD), an organic electroluminescence display (OELD), a cathode ray tube (CRT), or the like.

The operation receiving unit 17 is, for example, an input device such as a touch panel and a button, and is integrated with the display unit 16.

The storage unit 18 is, for example, a non-volatile memory such as a flash memory (SSD; Solid State Drive) and another solid-state memory. In the storage unit 18, the OS, an application for an audio call (including a telephone book application), and a program and data necessary for the process of making association with the smartphone 200 (paring process) are stored, for example.

The communication unit 19 is a module for connecting to a mobile network, corresponds to the wireless communication technique, and performs communication processing between the smartphone 200 and the server 300.

Figure 3:
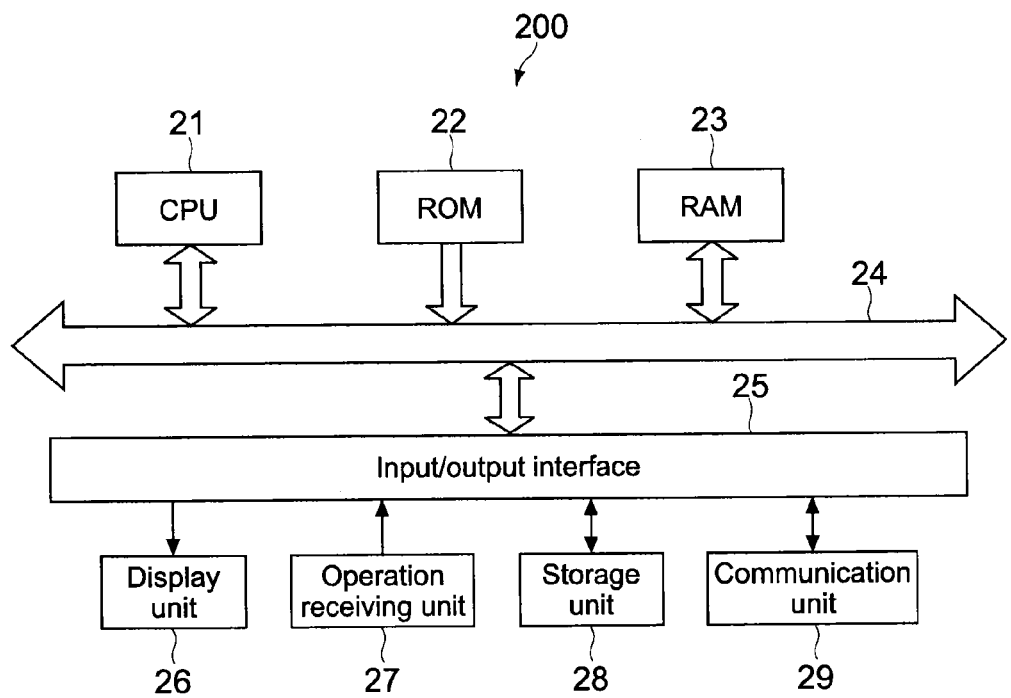
FIG. 3 is a diagram showing the hardware configuration of the other smartphone in the system.

FIG. 3 is a diagram showing the hardware configuration of the smartphone 200. As shown in FIG. 3, the smartphone 200 includes a CPU 21, a ROM 22, a RAM 23, a bus 24, an input/output interface 25, a display unit 26, an operation receiving unit 27, a storage unit 28, a communication unit 29, and the like, similarly to the smartphone 100.

(Configuration of Software and Data in System)

Figure 4:
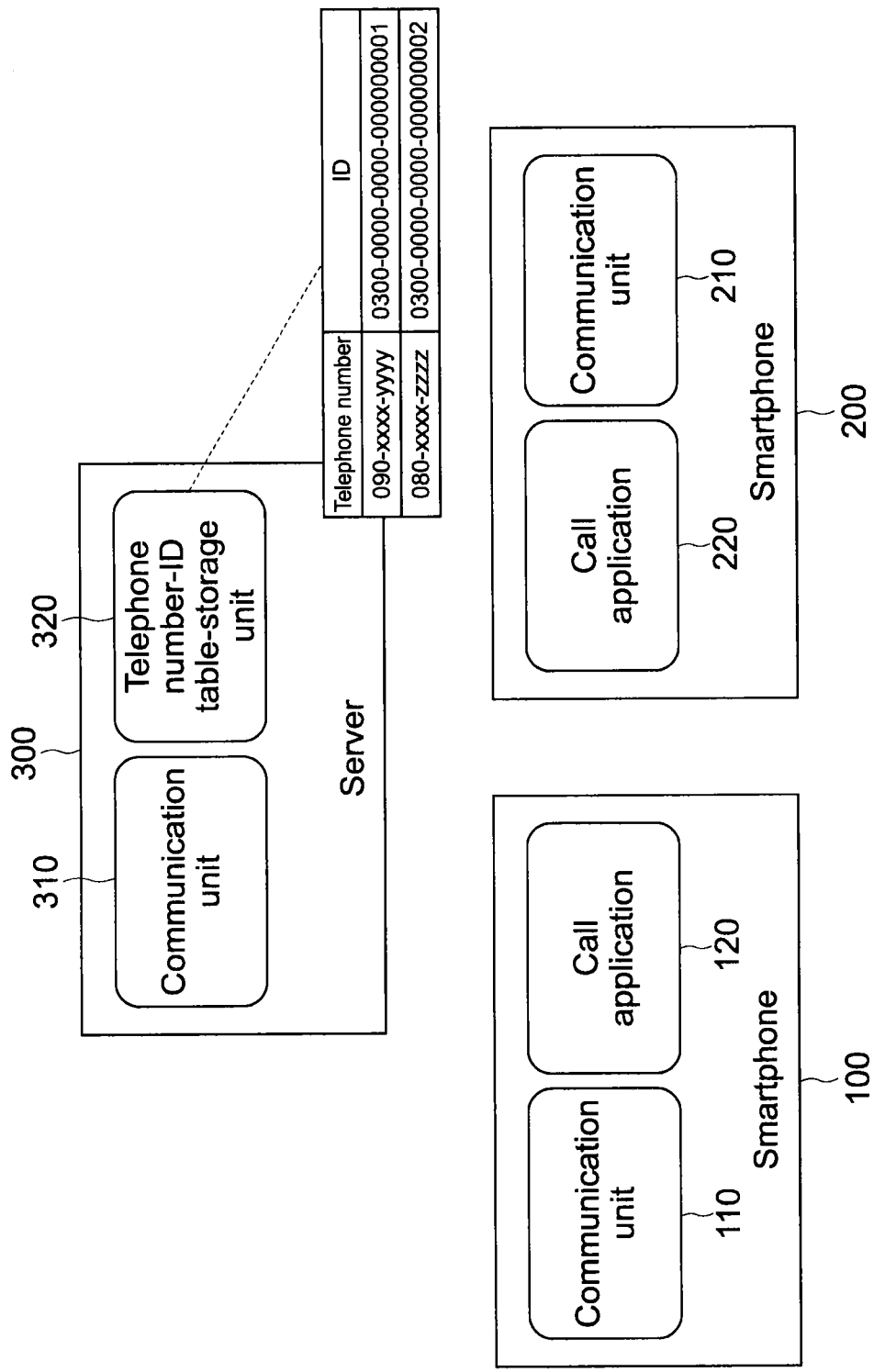
FIG. 4 is a diagram showing the configuration of software and data in the system.

FIG. 4 is a diagram showing the configuration of software and data of each apparatus in the system.

As shown in FIG. 4, as software, the smartphone 100, the smartphone 200, and the server 300 include communication units 110, 210, and 310 for communicating with each other, respectively.

Moreover, the smartphones 100 and 200 include call applications 120 and 220 for an audio call, respectively.

The server 300 includes a telephone number-ID table-storage unit 320. In the telephone number-ID table-storage unit 320, a telephone number-ID table is stored. The telephone number-ID table stores telephone numbers of the smartphones 100 and 200, which are IDs for an audio call, and apparatus IDs being IDs for communication by the wireless communication technique in relation to each other.

It should be noted that as the apparatus ID, an IP address, a Mac address, or another dedicated ID is used depending on the system.

As will be described later, the telephone number and the apparatus ID are transmitted from the smartphones 100 and 200 to the server 300, and are temporarily stored in the table, for example.

(Operation of System)

Next, the operation of the system configured as described above will be described. In the following description, the CPU 11 of the smartphones 100 and 200 will be described as a main operator. However, the operation is performed in cooperation with the program executed under control of the CPU.

Moreover, in the following, the description will be made with the smartphone 100 being as a caller and the smartphone 200 being as a call destination in the audio call between the smartphone 100 and the smartphone 200. The smartphone 100 is referred to as smartphone A and the smartphone 200 is referred to as smartphone B for simplicity in some cases.

(Process of Making Association with Apparatus being Call Destination)

Figure 5:
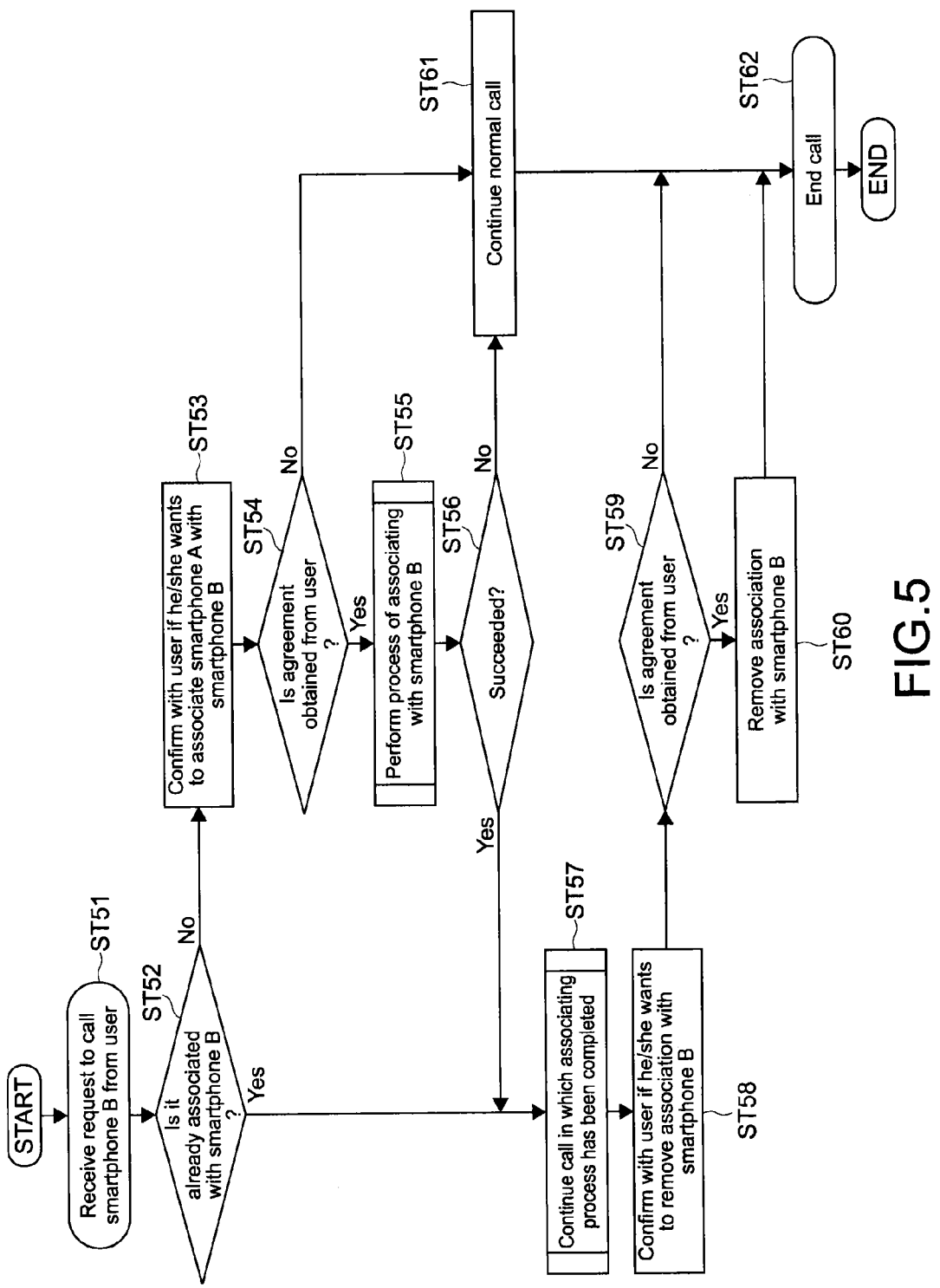
FIG. 5 is a flowchart showing a flow of the process of associating the smartphones with each other in the system.

FIG. 5 is a flowchart showing a rough flow of the associating process performed by the smartphone 100 in the system according to this embodiment.

Figure 6:
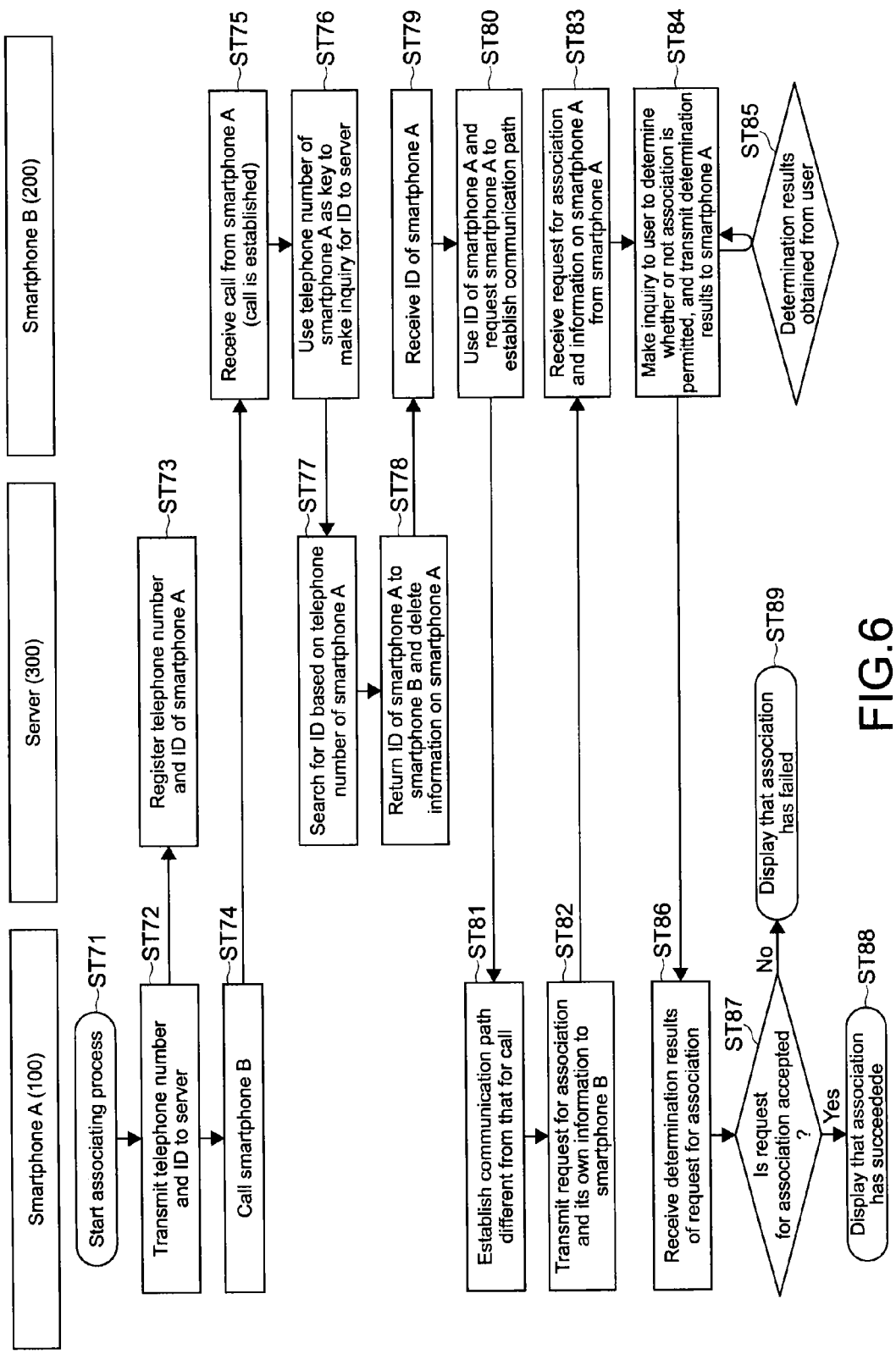
FIG. 6 is a sequence diagram showing operations performed by the smartphones and a server in the associating process.

Moreover, FIG. 6 is a sequence diagram showing a flow of the operations performed by the smartphone 100, the smartphone 200, and the server 300 in the associating process.

Figure 7:
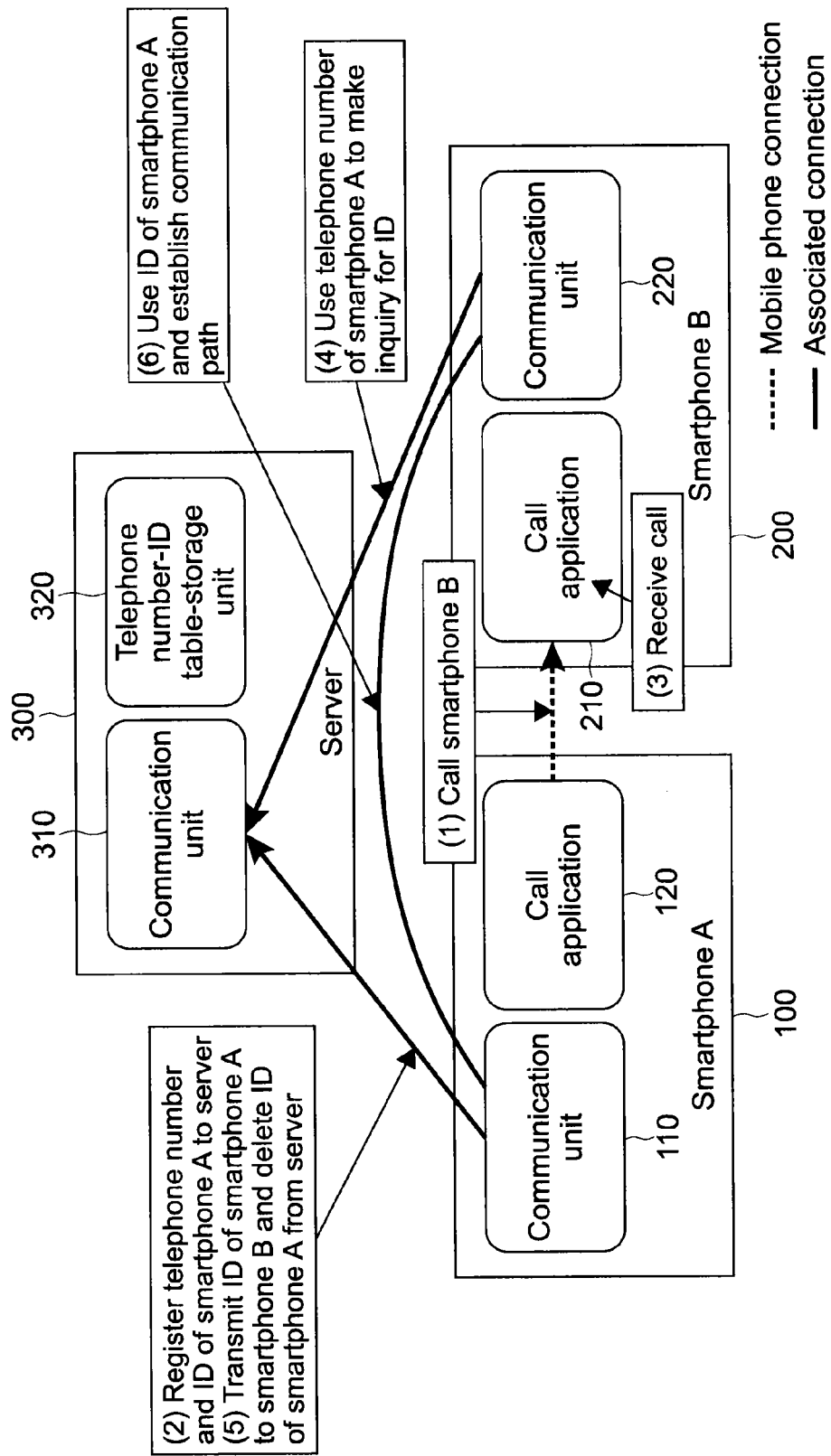
FIG. 7 is a diagram showing a flow of the associating process with the configuration diagram shown in FIG. 4.
Figure 8:
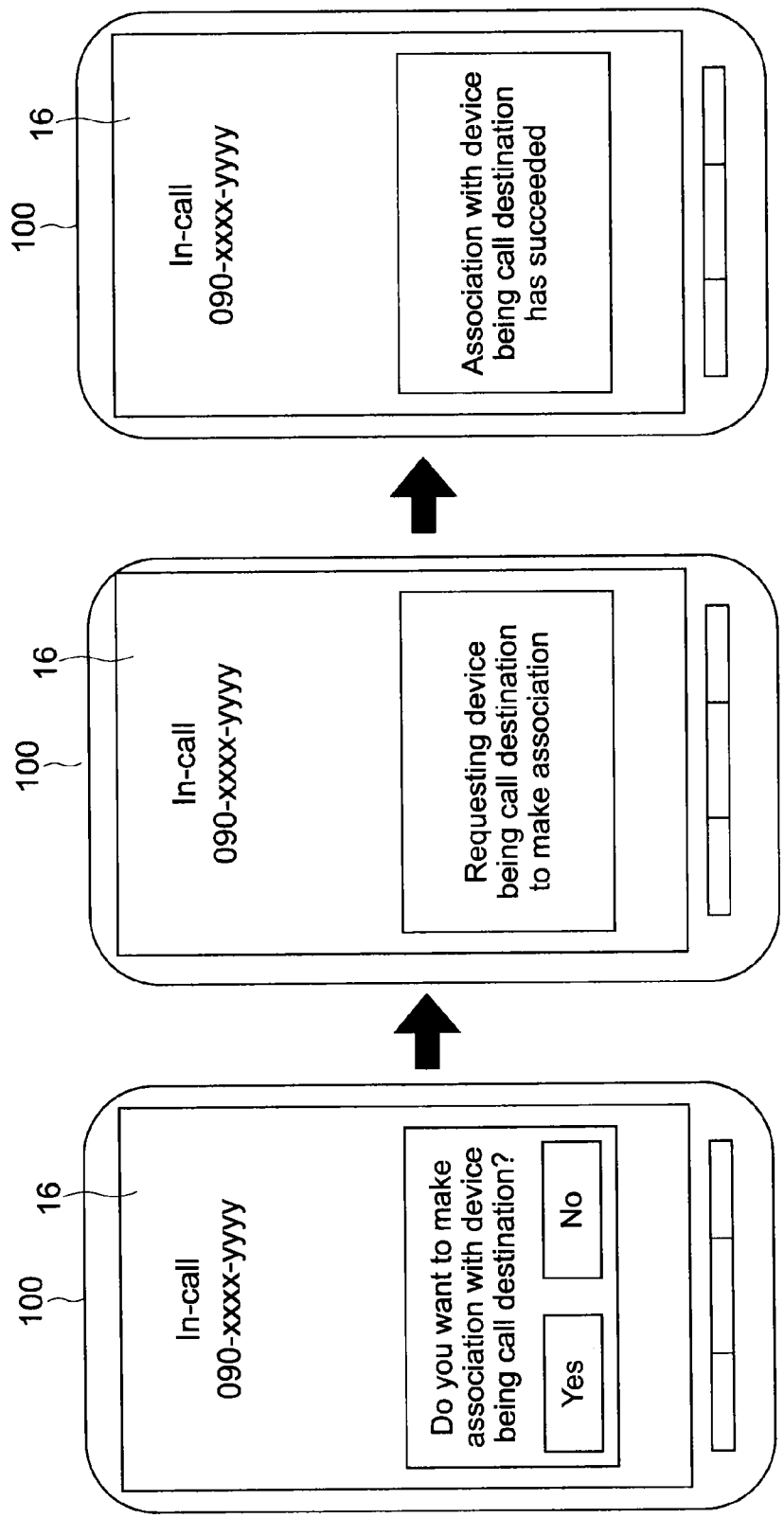
FIG. 8 is a diagram showing an example of a screen displayed in a display unit of the smartphone being a caller in the associating process.
Figure 9:
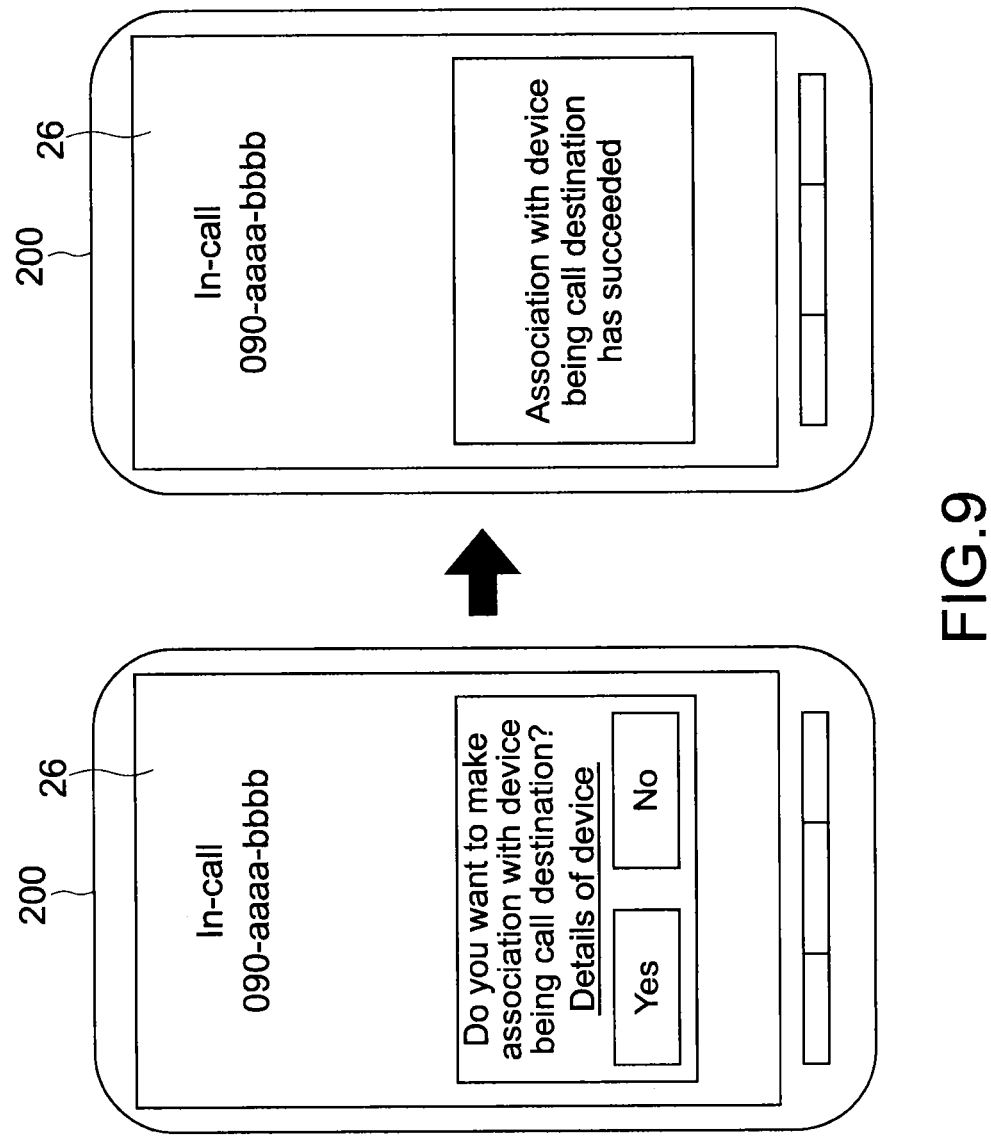
FIG. 9 is a diagram showing an example of a screen displayed in a display unit of the smartphone being a call destination in the associating process.
Figure 10:
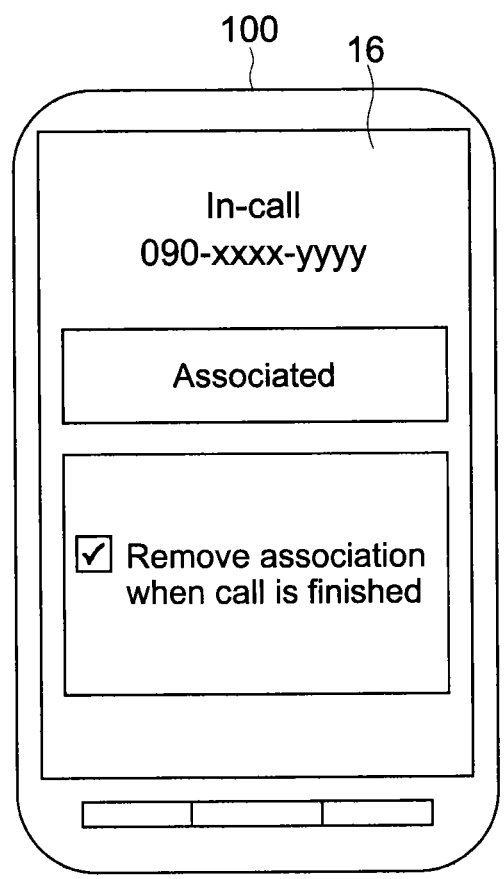
FIG. 10 is a diagram showing an example of a screen displayed in the display unit of the smartphone being a caller after the associating process is completed.

Moreover, FIG. 7 is a diagram showing a flow of the associating process with the configuration diagram shown in FIG. 4, FIG. 8 is a diagram showing an example of a screen displayed in the display unit 16 of the smartphone 100 being a caller in the associating process, FIG. 9 is a diagram showing an example of a screen displayed in the display unit. 26 of the smartphone 200 being a call destination in the associating process, and FIG. 10 is a diagram showing an example of a screen displayed in the display unit. 16 of the smartphone 100 being a caller after the associating process is completed.

As shown in FIG. 5, the CPU 11 of the smartphone 100 (hereinafter, referred to as smartphone A) is configured to receive a request to call the smartphone 200 (hereinafter, referred to as smartphone B) from a user (Step 51).

Next, the CPU 11 determines whether or not the smartphone A is already associated with the smartphone B (Step 52).

In the case where the CPU 11 determines that the smartphone A is not associated with the smartphone B (No in Step 52), the CPU 11 causes the display unit 16 to display a user interface screen for confirming with the user if he/she wants to associate the smartphone A with the smartphone B (Step 53).

The leftmost image in FIG. 8 is an example of the confirmation screen. As shown in the image, buttons (Yes/No) for selecting whether or not the process of making association with the apparatus being a call destination is performed are displayed on the screen.

Next, the CPU 11 determines whether or not agreement is obtained from the user on the confirmation screen, i.e., whether or not the user taps "Yes" on the confirmation screen (Step 54).

In the case where the CPU 11 determines that the agreement is obtained from the user (Yes in Step S54), the CPU 11 performs the process of making association with the smartphone B (Step 55). Details of the associating process will be described later.

Next, the CPU 11 determines whether or not the associating process has succeeded (Step 56).

In the case where the CPU 11 determines that the associating process has succeeded (Yes in Step 56), the CPU 11 continues the call in which the association has been completed (Step 57).

Next, the CPU 11 causes the display unit 16 to display a screen for confirming with the user if he/she wants to remove the association with the smartphone (Step 58).

The removal of the association represents that the apparatus ID stored in the respective storage units of the smartphones A and B is deleted and the established communication is cut off.

FIG. 10 is an example of the confirmation screen for removing the association. As shown in FIG. 10, a check box for causing the user to select whether or not the association with the smartphone B is removed when the call is terminated is displayed in the confirmation screen, for example. The screen may be continuously displayed after the associating process has been completed until the call is terminated.

Next, the CPU 11 determines whether or not the agreement is obtained from the user, i.e., whether or not the check box is turned on, on the confirmation screen for the removal of the association (Step 59).

In the case where the CPU 11 determines that the agreement of the removal of the association is obtained from the user (Yes in Step 59), the CPU 11 removes the association with the smartphone B (Step 60).

Then, the CPU 11 finishes the associating process at the time when the call with the smartphone B is terminated (Step 62).

In the case where the CPU 11 determines that the agreement is not obtained from the user in Step 54 (No in Step 54), the CPU 11 continues a normal call without the associating process (Step 61) and finishes the associating process at the time when the call is terminated (Step 62).

Moreover, also in the case where the agreement of the removal of the association is not obtained from the user in Step 59 (No in Step 59), any other process is not performed and the process is finished when the call is terminated (Step 62).

Next, the communication process along with the associating process between the smartphone 100 (A), the smartphone 200 (B), and the server 300 will be described with reference to FIG. 6 and FIG. 7.

As shown in FIG. 6, the CPU 11 of the smartphone A starts the process of making association with the smartphone B (Step 71) and transmits the telephone number and the apparatus ID of the smartphone A to the server 300 (Step 72).

When receiving the telephone number and the apparatus ID from the smartphone A, the server 300 stores the telephone number and the apparatus ID in the telephone number-ID table (Step 73) ((2) in FIG. 7).

Next, the CPU 11 of the smartphone A uses the call application 120 to call the smartphone B (Step 74), and the CPU 21 of the smartphone B uses the call application 220 to receive the call. Thus, the call is established (Step 75) ((1) and (3) in FIG. 7).

Next, the CPU 21 of the smartphone B uses the telephone number of the smartphone A as a key to make an inquiry for the apparatus ID of the smartphone A (Step 76) ((4) in FIG. 7).

When receiving the inquiry from the smartphone B, the server 300 searches the telephone number-ID table for the apparatus ID of the smartphone B associated with the telephone number (Step 77).

Then, the server 300 transmits the searched apparatus ID to the smartphone B before deleting the telephone number and the apparatus ID of the smartphone A from the telephone number-ID table (Step 78) ((5) in FIG. 7).

When receiving the apparatus ID of the smartphone A from the server 300 (Step 79), the CPU 21 of the smartphone B uses the received apparatus ID to request the smartphone A to establish a communication path (Step 80) ((6) in FIG. 7). The apparatus ID is stored in the RAM 23 or the storage unit 28 at least until the call is terminated, for example.

The CPU 11 of the smartphone A that has received the request to establish a communication path establishes a communication path between the smartphone A and the smartphone B (Step 81), and uses the established communication path to transmit, to the smartphone B, a request for association and information on the smartphone A (apparatus name, thumbnail, icon, and the like) (Step 82).

The central image in FIG. 8 is an example of a screen displayed in the display unit 16 of the smartphone A at the time when the request for association is transmitted.

When receiving the request for association and the apparatus information (Step 83), the CPU 21 of the smartphone B causes the display unit 26 to display a screen for making an inquiry to the user to determine whether or not the association is permitted, and transmits the determination results obtained from the user (Step 85) to the smartphone A (Step 84).

The left image in FIG. 9 is an example of a screen for making an inquiry to permit the association in the smartphone B. As shown in the image, buttons (Yes/No) for selecting whether or not the association is made with the smartphone A and a link for displaying the apparatus information on the smartphone A are displayed on the screen, for example.

The apparatus information on the smartphone A may be displayed not in the format of link but on the screen directly. Alternatively, only an image such as a thumbnail and an icon may be displayed.

In the case where "Yes" is selected on the inquiring screen, the CPU 21 causes the display unit 26 to display that the smartphone B has succeeded in the association with the smartphone A. The right image in FIG. 9 is an example of a screen showing the success of the association.

When receiving the determination results from the user with respect to the request for association (Step 86), the CPU 11 of the smartphone A determines whether or not the request for association is accepted (Step 87).

In the case where the CPU 11 determines the request for association is accepted (Yes in Step 87), the CPU 11 causes the display unit 16 to display that the association with the smartphone B has succeeded (Step 88). The rightmost image in FIG. 8 is an example of a screen showing the success of the association.

As a result of the success of the association, the smartphone A stores the apparatus ID of the smartphone B in the RAM 13 or the storage unit 18 at least until the call is terminated.

In the case where the CPU 11 determines that the request for association is not accepted (No in Step 87), the CPU 11 causes the display unit 16 to display that the association with the smartphone B has failed (Step 89) (not shown).

In the above-mentioned associating processes, the process of obtaining, from the user, the agreement of transmission of the request for association, acceptance of the request for association, removal of the association, and the like (Step 53 and Step 58 in FIG. 5, and Step 84 in FIG. 6) may be omitted by prior setting.

In the case where the smartphone A is set to be constantly associated with the apparatus being a call destination, for example, the smartphone A may automatically transmit the request for association to the smartphone B at the same time when the call starts, and the smartphone B may automatically transmit the acceptance of the request for association.

Moreover, in the case where the smartphone A is set to remove the association when the call is terminated, the smartphone A may automatically remove the association when the call is terminated.

In the case where the removal of the association is not set or agreement for the removal of the association is not obtained from the user, the apparatus ID of the smartphone B is not deleted from the smartphone A even after the call is terminated, and the state where the apparatuses are associated with each other, i.e., communication is possible, is kept.

(Process of Making Association with Neighboring Apparatus of Apparatus being Call Destination)

In this embodiment, the smartphone 100 is capable of performing the process of making association with not only the smartphone 200 being a call destination but also a neighboring apparatus of the smartphone 200. Now, this process will be described.

Figure 11:
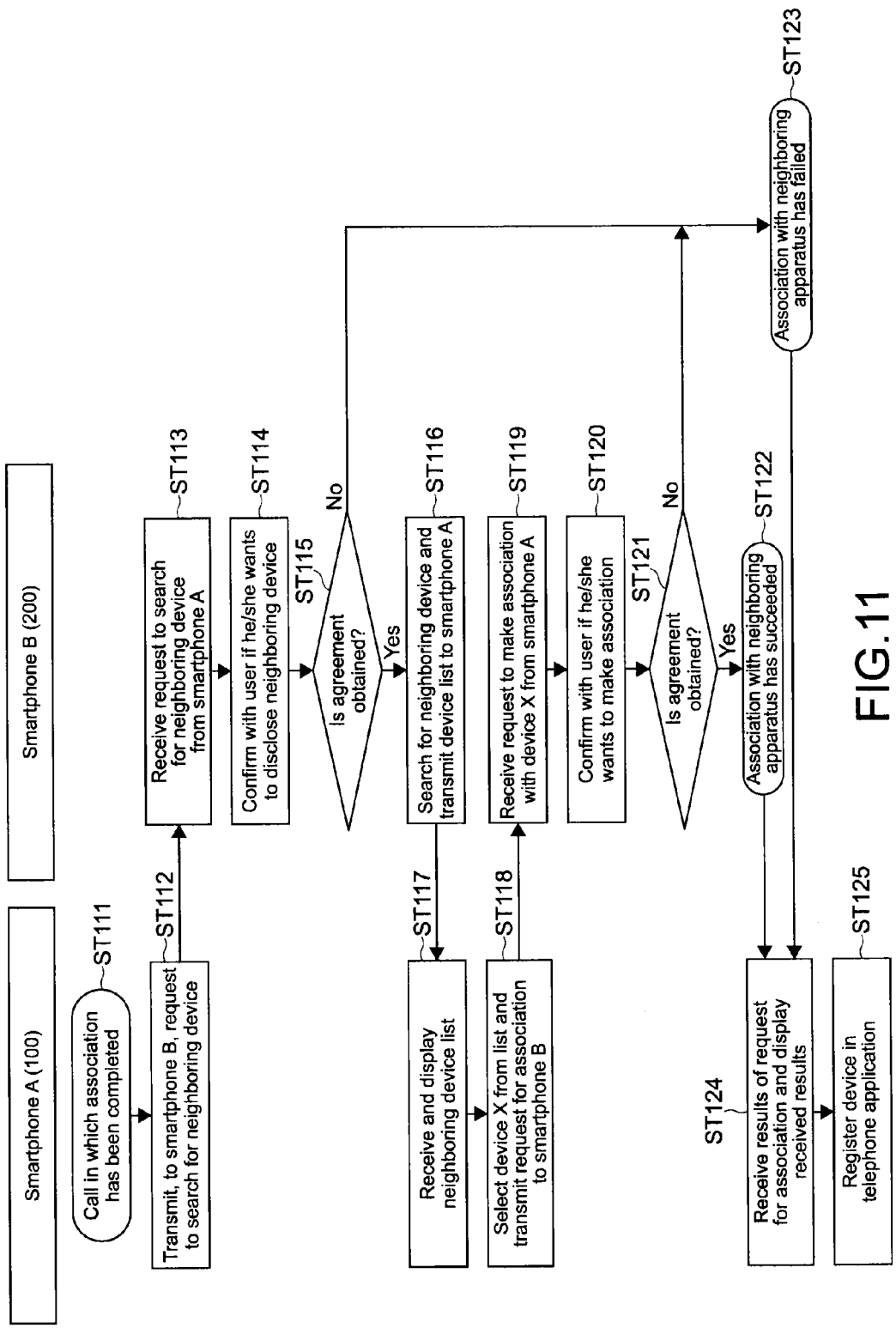
FIG. 11 is a flowchart showing a flow of the process of making association with a neighboring apparatus of the apparatus being a call destination, which is performed by the smartphone.

FIG. 11 is a flowchart showing a flow of the process of making association with a neighboring apparatus of the apparatus being a call destination. Moreover, FIG. 12 is a diagram showing an example of a screen displayed in the display unit 16 of the smartphone 100 (A) being a caller in the process of making association with the neighboring apparatus, and FIG. 13 is a diagram showing an example of a screen displayed in the display unit 26 of the smartphone 200 (B) being a call destination in the process of making association with the neighboring apparatus.

As shown in FIG. 11, the CPU 11 of the smartphone A transmits, to the smartphone B, a request to search for the neighboring device of the smartphone B (Step 112) based on a user's operation or automatically, in the calling state in which the association with the smartphone B has been completed (Step 111).

Figure 12:
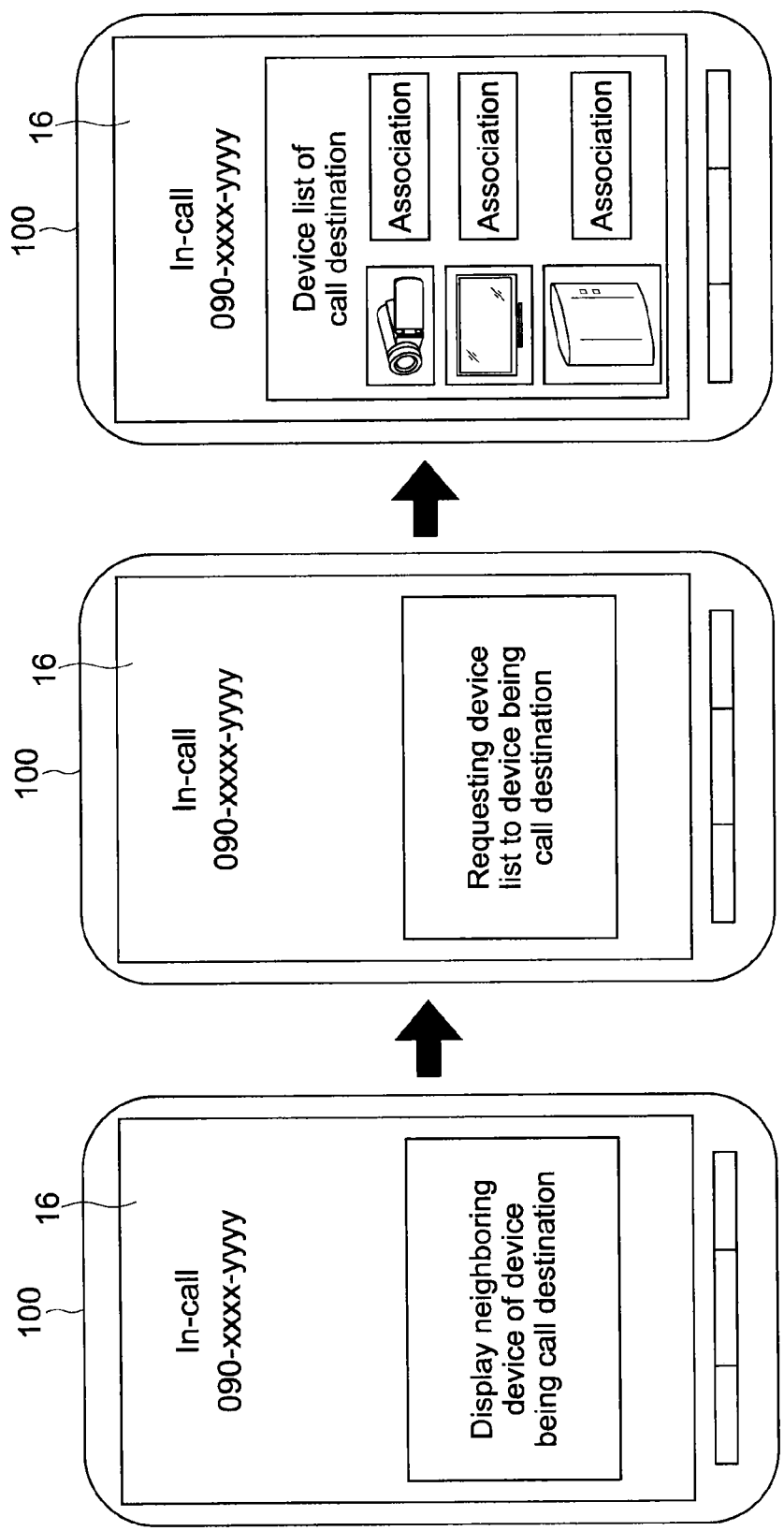
FIG. 12 is a diagram showing an example of a screen displayed in the display unit of the smartphone being a caller in the process of making association with the neighboring apparatus.
Figure 13:
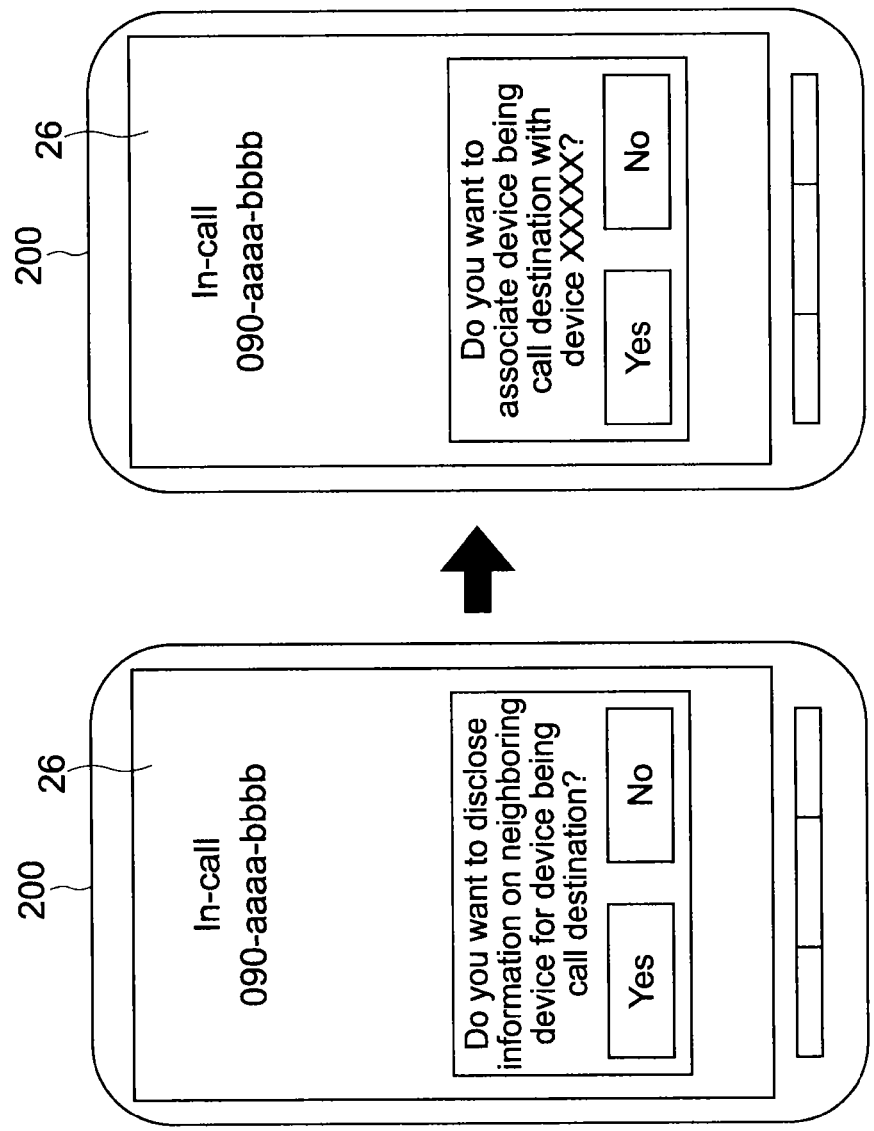
FIG. 13 is a diagram showing an example of a screen displayed in the display unit of the smartphone being a call destination in the process of making association with the neighboring apparatus.

The leftmost image in FIG. 12 is an example of a screen for confirming with the user of the smartphone A if he/she wants to search for a neighboring device of the smartphone B. If the user taps the display area of character information on the screen, the request to search for the neighboring device is transmitted to the smartphone B, and an indication that the smartphone A is requesting for the list of neighboring devices of the smartphone B is displayed on the display unit 16 of the smartphone A as shown in the central image in FIG. 12.

When receiving the request to search for the neighboring device (Step 113), the CPU 21 of the smartphone B causes the display unit 26 to display a screen for confirming with the user if he/she wants to disclose information on the neighboring device as a result of the neighboring device search (step 114).

The left image in FIG. 13 is an example of the confirmation screen of the neighboring device search. On the screen, buttons (Yes/No) for selecting whether or not the information on the neighboring device is disclosed on the smartphone A as a result of the neighboring device search are displayed.

In the case where the CPU 21 receives the selection (Yes) of accepting the disclosure of the neighboring device information from the user (Step 115), the CPU 21 searches for the neighboring device, and transmits the neighboring device list obtained by the search to the smartphone A (Step 116). For the neighboring device search, a function such as Discovery in Universal Plug and Play (UPnP) is used, for example.

When receiving the neighboring device list from the smartphone B, the CPU 11 of the smartphone A causes the display unit to display a user interface screen for selecting a neighboring device to be associated with the smartphone A from the list (Step 117).

The rightmost image in FIG. 12 is an example of the screen for selecting a neighboring device. As shown in the image, a list of thumbnails of the neighboring devices of the smartphone B is displayed together with the respective buttons for instructing association on the selection screen, for example.

In the case where a neighboring device being an association target (hereinafter, referred to as device X) is selected on the selection screen, the CPU 11 transmits, to the smartphone B, a request to make association with the device X (Step 118).

When receiving the request to make association with the device X (Step 119), the CPU 21 of the smartphone causes the display unit 26 to display a screen for confirming with the user if he/she wants to associate the smartphone A with the device X (Step 120).

The right image in FIG. 13 is an example of the confirmation screen for making association with the device X. On the screen, buttons (Yes/No) for selecting whether or not the smartphone A is associated with the device X are displayed.

In the case where the agreement is obtained, i.e., "Yes" is tapped on the confirmation screen (Yes in Step 121), the CPU 21 performs the process of associating the smartphone A with the device X. Specifically, the CPU 21 transmits information such as the apparatus ID of the device X together with information representing that the associating process has succeeded (Step 122).

On the other hand, in the case where the agreement is not obtained on the confirmation screen (No in Step 121), the CPU 21 transmits information representing that the association with the device X has failed to the smartphone (Step 123).

The CPU 11 of the smartphone A receives the information representing that the associating process has succeeded or failed in response to the request for association, and causes the display unit 16 to display the received results (Step 124).

Moreover, in the case where the process of making association with the device X has succeeded, the received information on the device X (apparatus name, thumbnail, and the like) is registered on the entry of the telephone book application, which represents the user of the smartphone B (Step 125).

With the registration of information in the telephone book application, information on the device X is displayed as a part of the user interface of the telephone book application (detailed information (name, mail address, and the like) on the user of the smartphone B) on the smartphone A.

Figure 14:
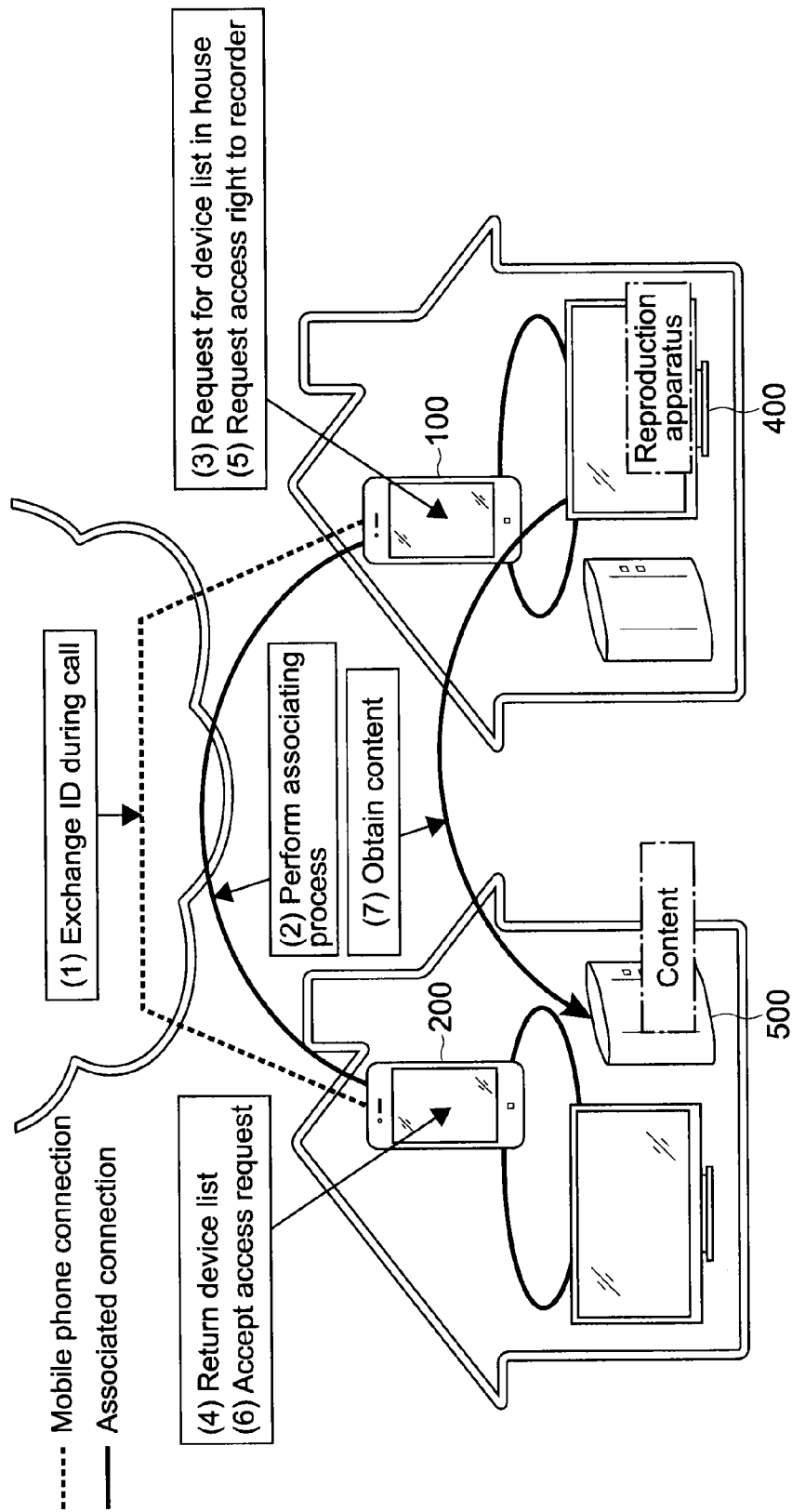
FIG. 14 is a diagram showing an example of a use case in the process of making association with the neighboring apparatus.

FIG. 14 is a diagram showing an example of a use case in the process of making association with the neighboring device.

FIG. 14 shows an example in which the smartphone 100 obtains content from a distant house.

As shown in FIG. 14, when the smartphone 100 exchanges the apparatus ID with the smartphone 200 during the audio call and the associating process is completed ((1) and (2) in FIG. 14), the smartphone 100 requests, to the smartphone 200, for the device list in the house in which the smartphone 200 is ((3) in FIG. 14).

When the smartphone 200 returns the device list in response to the request ((4) in FIG. 14), the smartphone 100 requests for access right to a network recorder 500 in the device list to the smartphone 200 ((5) in FIG. 14).

When the smartphone 200 accepts the request ((6) in FIG. 14), the smartphone 100 obtains content from the network recorder 500 ((7) in FIG. 14) and thus can reproduce the content by a reproduction apparatus 400 in the house in which the smartphone 100 is.

Figure 15:
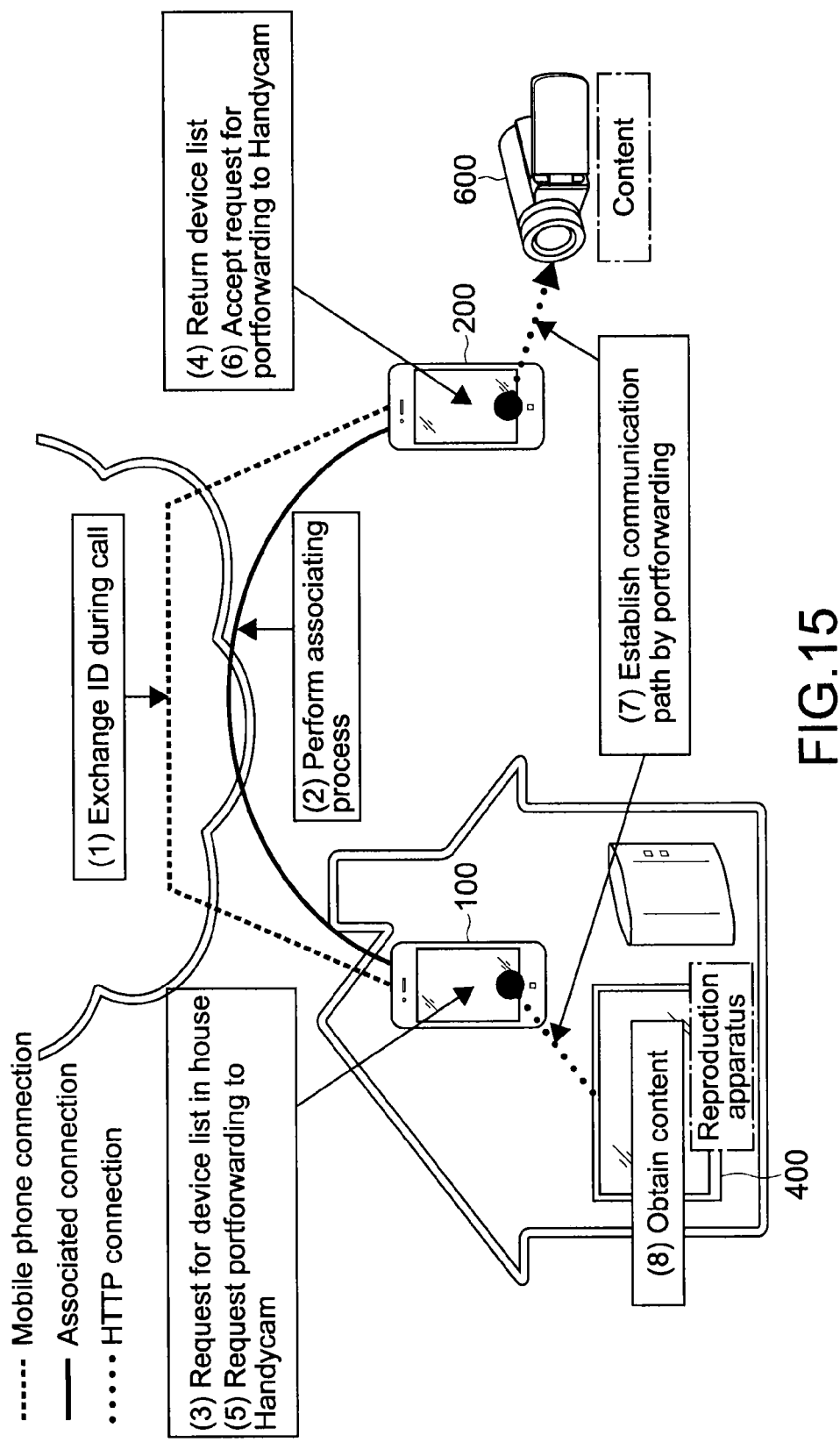
FIG. 15 is a diagram showing another example of the use case in the process of making association with the neighboring apparatus.

FIG. 15 is a diagram showing another example of the use case in the process of making association with the neighboring apparatus.

FIG. 15 shows an example in which the user of the smartphone 200 receives the request from the user of the smartphone 100 on the outside to allow the user of the smartphone 100 to access the apparatus he/she is carrying, which supports HTTP connection (e.g., Handycam (registered trademark)).

As shown in FIG. 15, when the smartphone 100 exchanges the apparatus ID with the smartphone 200 during the audio call and the associating process is completed ((1) and (2) in FIG. 15), the smartphone 100 requests, to the smartphone 200, for the device list in the house in which the smartphone 200 is ((3) in FIG. 15).

When the smartphone 200 returns the device list in response to the request ((4) in FIG. 15), the smartphone 100 requests, to the smartphone 200, for portforwarding to a Handycam 600 in the device list ((5) in FIG. 15).

When the smartphone 200 accepts the request ((6) in FIG. 15), an HTTP communication path between the Handycam 600 and the reproduction apparatus 400 is established by the portforwarding via the smartphone 100 and the smartphone 200 ((7) in FIG. 15). Accordingly, the user of the smartphone 100 can obtain content recorded by the Handycam 600 with the reproduction apparatus 400 in his/her house, and reproduce the obtained content ((8) in FIG. 15).

(Conclusion of Embodiment)

As described above, according to this embodiment, it is possible to make association between devices only with an audio call and a simple user's operation associated therewith, without a complicated paring process performed between the devices.

Modified Example

Embodiments of the present disclosure are not limited to the above-mentioned embodiments and various modifications can be made without departing from the gist of the present disclosure.

In the above-mentioned embodiment, an example in which the apparatus ID of the smartphone 100 being a caller is transmitted to the smartphone 200 being a call destination in the associating process has been shown. However, the apparatus ID of the smartphone 200 being a call destination may be transmitted to the smartphone 100 being a caller, and the apparatus IDs of the smartphones 100 and 200 may be exchanged with each other.

In the above-mentioned embodiment, an example in which the association between the devices is valid during the call has been shown. However, the time period of the valid association can be appropriately set.

For example, in the case where the association is valid only during a call, the user of the smartphone 100 having a PC as a neighboring device can give an authority to an operator of a support center to operate the PC only during a call with the smartphone 200 of the support center.

Moreover, once the association between devices is completed during a call, the association may be valid even after the call is terminated. In this case, the received apparatus ID of the apparatus being a call destination in the associating process is stored in the storage unit of the device. By using the stored apparatus ID to perform communication, the user of the smartphone 100 can freely obtain content from the smartphone 200 or the neighboring device thereof, and store the obtained content in the smartphone 100 or another apparatus.

Moreover, once the association between devices is completed during a call, an authority to make new association may be given even after the call is terminated. For example, in the case where the smartphone 100 is associated with the smartphone 200 during a call, an authority to make association with a neighboring device that is associated with the smartphone 200 after the call is terminated may be given to the smartphone 100.

In the above-mentioned embodiment, the apparatus ID for association is transmitted and received through a communication path different from that for an audio call. However, the apparatus ID may be transmitted and received through the same line as the audio call line.

For example, in the case where the smartphone 100 calls the smartphone 200 and the call is established, the smartphone 100 may convert its own apparatus ID into an audio signal in a predetermined pattern and transmit the audio signal to the smartphone 200 through the audio call line. The smartphone 200 can obtain the apparatus ID of the smartphone 100 by demodulating the audio signal.

In this case, a hook signal may be inserted before and after the audio signal representing the apparatus ID to distinguish the audio signal from another audio signal.

Moreover, in order to prevent the audio call made by the user from being disturbed, the audio signal representing the apparatus ID may be transmitted as a signal having an inaudible frequency (ultrasonic wave).

In the above-mentioned embodiment, a user interface screen is displayed on the display unit to confirm the necessity of transmission of the request for association or acceptance of the request for association, for example. In this case, the user may be informed of the display of the user interface screen by, for example, audio output taking into account the possibility that the user does not watch the display unit during the audio call.

In the above-mentioned embodiment, the smartphone being a call destination is notified of the apparatus ID stored in the server 300 (or the call is terminated) before the apparatus ID is deleted from the server 300. However, the apparatus ID does not have to be deleted after the call is terminated, and may be stored together with the corresponding telephone number in a secured state. In this case, after the call is terminated, the device may make an inquiry to the server 300 for the apparatus ID of a communication destination for association and obtain the apparatus ID.

In the above-mentioned embodiment, the server 300 is used to exchange the apparatus ID. However, the server does not necessarily need to be provided, and the smartphones may directly exchange the apparatus IDs with each other.

In the above-mentioned embodiment, a neighboring device of the smartphone 200 is searched for in response to the request from the smartphone 100. However, in the case where the smartphone 200 discloses the neighboring device information, the neighboring device list of the smartphone 200 may be automatically transmitted to the smartphone 100 being a caller, and displayed without the search process.

In the above-mentioned embodiment, an example of the audio call using a line dedicated to a mobile phone has been shown. However, the embodiment of the present disclosure may be applied to IP telephone (audio call using Voice over Internet Protocol (VoIP)). In this case, the apparatus for calling is not limited to the smartphone, and may be another information processing apparatus such as a PC.

In this case, because a unique telephone number for a call is not provided to the apparatuses during a call, information on the accessing apparatus (which apparatus logs in) may be transmitted to the server 300 or the apparatus being a destination to make association with the apparatus ID. At this time, the type of the apparatus (e.g., PC, smartphone, or the like) may be transmitted.

(Others)

It should be noted that the present disclosure may also take the following configurations.

(1) An information processing apparatus, including:
    a communication unit; and
    a controller configured to control the communication unit
        to perform one of transmission and reception of second identification information for communication through a predetermined communication path with a different apparatus, and
        to establish connection with the different apparatus by using the second identification information, during an audio call with the different apparatus, the audio call using first identification information for an audio call, the second identification information being associated with the first identification information.

(2) The information processing apparatus according to (1) above, further including
    a display unit, the controller being configured to control the display unit to display a user interface configured
        to receive the second identification information, and
        to receive an operation of determining whether or not communication is established, the operation being performed by a user of the information processing apparatus.

(3) The information processing apparatus according to (1) or (2) above, in which
    the controller is configured to control the communication unit to cut off the established communication in a case where the audio call is terminated.

(4) The information processing apparatus according to (1) or (2) above, further including
    a storage unit, the controller being configured
        to control the storage unit to store the second identification information received from the different apparatus, and
        to control the communication unit to establish communication with the different apparatus with the stored second identification information after the audio call is terminated.

(5) The information processing apparatus according to any one of (1) to (4) above, in which
    the controller is configured to control the communication unit
        to transmit, to the different apparatus, a request to search for at least one neighboring apparatus that is communicated with the different apparatus, and
        to establish communication with the at least one neighboring apparatus searched for by the different apparatus in response to the request, during the audio call.

(6) The information processing apparatus according to (5) above, further including
    a display unit, the controller being configured
        to control the communication unit to receive information on a list of the at least one neighboring apparatus, and
        to control the display unit to display a user interface that receives an operation of selecting one of the at least one neighboring apparatus as a communication target based on the information of the list, the at least one neighboring apparatus being searched for by the different apparatus in response to the request.

(7) The information processing apparatus according to any one of (1) to (6) above, in which
    the controller is configured to control the communication unit to perform one of transmission and reception of the second identification information through a communication path different from the communication path for the audio call with the different apparatus.

(8) The information processing apparatus according to (7) above, in which
    the controller is configured to perform one of transmission and reception of the second identification information via a server apparatus on a predetermined network, the server apparatus being capable of connecting with the information processing apparatus and the different apparatus, and
    the server apparatus is configured
        to receive the second identification information of one of the information processing apparatus and the different apparatus from one of the information processing apparatus and the different apparatus and store the received second identification information when the audio call starts, and
        to remove the stored second identification information when the audio call is terminated.

(9) The information processing apparatus according to any one of (1) to (6) above, in which
    the controller is configured to control the communication unit to perform one of transmission and reception of the second identification information through the communication path for the audio call as an audio signal that can be demodulated between the controller and the different apparatus.

(10) The information processing apparatus according to (9) above, in which
    the controller is configured to perform one of transmission and reception of the second identification information as a signal having an inaudible frequency.

(11) The information processing apparatus according to any one of (2) to (10) above, further including
    an audio output unit, the controller being configured to control the audio output unit to output audio information representing that the user interface is displayed.

(12) The information processing apparatus according to any one of (2) to (11), in which
    the controller is configured to control the display unit to display information on the different apparatus that has established the communication as a part of a user interface of an application for an audio call, the user interface including a list of a name of a user of the different apparatus and the first identification information, the different apparatus being identified by the second identification information.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    communication circuitry;
    controller circuitry configured to control the communication circuitry to
        perform one of transmission and reception of second identification information for communication through a predetermined communication path with a different apparatus, and
        establish connection with the different apparatus by using the second identification information, during an audio call with the different apparatus, the audio call using first identification information for the audio call, the second identification information being associated with the first identification information; and a display, the controller circuitry being configured to control the display to display a user interface configured to receive the second identification information, and receive an operation of determining whether or not communication is established.

2. The information processing apparatus according to claim 1, wherein the controller circuitry is configured to control the communication circuitry to cut off the established communication in a case where the audio call is terminated.

3. The information processing apparatus according to claim 1, further comprising a storage, the controller circuitry being configured to control the storage to store the second identification information received from the different apparatus, and control the communication circuitry to establish communication with the different apparatus with the stored second identification information after the audio call is terminated.

4. The information processing apparatus according to claim 1, wherein the controller circuitry is configured to control the communication circuitry to transmit, to the different apparatus, a request to search for at least one neighboring apparatus that is communicated with the different apparatus, and establish communication with the at least one neighboring apparatus searched for by the different apparatus in response to the request, during the audio call.

5. The information processing apparatus according to claim 4, wherein the controller circuitry being configured to control the communication circuitry to receive information on a list of the at least one neighboring apparatus, and control the display to display a user interface that receives an operation of selecting one of the at least one neighboring apparatus as a communication target based on the information of the list, the at least one neighboring apparatus being searched for by the different apparatus in response to the request.

6. The information processing apparatus according to claim 1, wherein the controller circuitry is configured to control the communication circuitry to perform one of transmission and reception of the second identification information through a communication path different from the communication path for the audio call with the different apparatus.

7. The information processing apparatus according to claim 6, wherein the controller circuitry is configured to perform one of transmission and reception of the second identification information via a server apparatus on a predetermined network, the server apparatus being capable of connecting with the information processing apparatus and the different apparatus, and the server apparatus is configured to receive the second identification information of one of the information processing apparatus and the different apparatus from one of the information processing apparatus and the different apparatus and store the received second identification information when the audio call starts, and remove the stored second identification information when the audio call is terminated.

8. The information processing apparatus according to claim 1, wherein the controller circuitry is configured to control the communication circuitry to perform one of transmission and reception of the second identification information through the communication path for the audio call as an audio signal that can be demodulated between the controller and the different apparatus.

9. The information processing apparatus according to claim 8, wherein the controller circuitry is configured to perform one of transmission and reception of the second identification information as a signal having an inaudible frequency.

10. The information processing apparatus according to claim 1, further comprising audio output circuitry, the controller being configured to control the audio output circuitry to output audio information representing that the user interface is displayed.

11. The information processing apparatus according to claim 1, wherein the controller circuitry is configured to control the display to display information on the different apparatus that has established the communication as a part of a user interface of an application for an audio call, the user interface including a list of a name of a user of the different apparatus and the first identification information, the different apparatus being identified by the second identification information.

12. An information processing method, comprising:

performing one of transmission and reception of second identification information for communication through a predetermined communication path with a different apparatus;

establishing connection with the different apparatus by using the second identification information, during an audio call with the different apparatus, the audio call using first identification information for an audio call, the second identification information being associated with the first identification information; and displaying a user interface configured to receive the second identification information, and receive an operation of determining whether or not communication is established.

13. A non-transitory computer readable medium having stored thereon a program that causes an information processing apparatus to execute the steps of:

performing one of transmission and reception of second identification information for communication through a predetermined communication path with a different apparatus;

establishing connection with the different apparatus by using the second identification information, during an audio call with the different apparatus, the audio call using first identification information for an audio call, the second identification information being associated with the first identification information; and displaying a user interface configured to receive the second identification information, and receive an operation of determining whether or not communication is established.

* * * * *